(12) United States Patent
Holden et al.

(10) Patent No.: US 9,346,962 B2
(45) Date of Patent: May 24, 2016

(54) FIRE RESISTANT GLAZINGS

(71) Applicant: PILKINGTON GROUP LIMITED, Lathom (GB)

(72) Inventors: David William Holden, Orrell (GB); Stephen Ian Bond, Burtonwood (GB); Karikath Sukumar Varma, Birkdale (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 13/261,945

(22) PCT Filed: Feb. 27, 2013

(86) PCT No.: PCT/GB2013/050478
§ 371 (c)(1),
(2) Date: Aug. 27, 2014

(87) PCT Pub. No.: WO2013/128180
PCT Pub. Date: Sep. 6, 2013

(65) Prior Publication Data
US 2015/0056456 A1 Feb. 26, 2015

(30) Foreign Application Priority Data
Feb. 29, 2012 (GB) .................................. 1203529.1

(51) Int. Cl.
| | | |
|---|---|---|
| *C09D 5/18* | (2006.01) | |
| *C03C 17/22* | (2006.01) | |
| *C03C 17/25* | (2006.01) | |
| *B32B 17/06* | (2006.01) | |
| *C03C 17/00* | (2006.01) | |
| *C04B 28/26* | (2006.01) | |
| *C04B 20/10* | (2006.01) | |
| *C09K 21/02* | (2006.01) | |
| *C03C 27/10* | (2006.01) | |
| *C04B 111/00* | (2006.01) | |
| *C04B 111/28* | (2006.01) | |

(52) U.S. Cl.
CPC .............. *C09D 5/185* (2013.01); *B32B 17/069* (2013.01); *C03C 17/007* (2013.01); *C03C 17/22* (2013.01); *C03C 17/25* (2013.01); *C03C 27/10* (2013.01); *C04B 20/1066* (2013.01); *C04B 28/26* (2013.01); *C09K 21/02* (2013.01); *C03C 2217/45* (2013.01); *C03C 2217/475* (2013.01); *C03C 2218/11* (2013.01); *C04B 2111/00612* (2013.01); *C04B 2111/28* (2013.01); *Y02W 30/95* (2015.05)

(58) Field of Classification Search
None
See application file for complete search history.

(56) References Cited

U.S. PATENT DOCUMENTS

| | | | |
|---|---|---|---|
| 4,190,698 A | 2/1980 | De Boel et al. | |
| 5,547,720 A * | 8/1996 | Rittler | 428/34 |
| 5,565,273 A * | 10/1996 | Egli et al. | 428/426 |
| 6,479,156 B1 | 11/2002 | Schmidt et al. | |
| 7,045,080 B1 | 5/2006 | Youngs | |
| 7,189,285 B2 | 3/2007 | Holland et al. | |
| 7,947,384 B2 | 5/2011 | Holland et al. | |
| 2011/0020654 A1 | 1/2011 | Schwankhaus et al. | |
| 2012/0321901 A1 * | 12/2012 | Gelderie et al. | 428/428 |

FOREIGN PATENT DOCUMENTS

| | | |
|---|---|---|
| DE | 19720269 A1 | 11/1998 |
| EP | 0620781 B1 | 5/1999 |
| EP | 2014740 A1 | 1/2009 |
| GB | 2380160 A | 4/2003 |
| KR | 20110073849 A | 6/2011 |
| WO | 2007/144369 A1 | 12/2007 |
| WO | WO 2012136681 A1 * | 10/2012 |

OTHER PUBLICATIONS

Kandola et al., "Enhancement of Passive Fire Protection Ability of Inorganic Fire Retardants in Vinyl Ester Resin Using Glass Frit Synergists," Journal of Fire Sciences, 2010.*
Performance Process, "Hydrophobic Fumed and Precipitated Silica" Dec. 2004 (no author).*

* cited by examiner

*Primary Examiner* — David Sample
(74) *Attorney, Agent, or Firm* — Marshall & Melhorn, LLC

(57) ABSTRACT

An aqueous mixture for the production of fire resistant glazings comprising: at least one alkali metal silicate, at least one glass, glass-ceramic and/or ceramic additive, and water, wherein the at least one glass, glass-ceramic and/or ceramic additive has at least one boron containing moiety directly or indirectly attached to a surface thereof by covalent or ionic bonding.

23 Claims, No Drawings

FIRE RESISTANT GLAZINGS

BACKGROUND OF THE INVENTION

This invention relates to solutions for the production of fire resistant glazings, interlayers produced from said solutions, fire resistant glazings and laminated fire resistant glazings comprising said interlayers and methods for the preparation of said solutions, interlayers, fire resistant glazings and laminated fire resistant glazings. This invention also relates to buildings and fire resistant glazing assemblies incorporating said fire resistant glazings.

Glass laminates incorporating an intumescent inorganic silicate interlayer sandwiched between two opposed panes of glass are sold under the trade marks PYROSTOP and PYRODUR by the Pilkington group of companies. When such laminates are exposed to a fire the inorganic interlayer intumesces and expands to form a foam layer. The foam provides a thermally insulating layer which protects the pane of glass remote from the fire so that the structural integrity of the glass unit, which acts as a barrier preventing the propagation of the fire, is maintained for a longer period. Glass laminates incorporating such intumescent interlayers have been used successfully as fire resistant glass structures. These laminates may comprise more than two panes of glass sandwiching more than one intumescent interlayer. Laminates comprising up to eight intumescent interlayers have been employed. These multi layered laminates are relatively thick and correspondingly expensive.

The intumescent inorganic layer is normally formed from a sodium silicate waterglass or a mixture thereof with potassium or lithium silicate waterglasses. The layer is commonly formed by preparing a solution of the silicate, spreading that solution on the surface of the glass and drying excess water from the solution so as to form the intumescent inorganic layer.

WO 2007/144369 describes the use of bubble initiation elements in intumescent layers in order to avoid glass bursts due to localised accumulation of water vapour. The initiation elements may be silica or glass particles and are said to support the homogeneous distribution of bubbles.

SUMMARY OF THE INVENTION

There exists the need to provide improved fire performance of layers of intumescent material produced by a drying process, or indeed other processes such as casting into a sealed cell and solidifying, without having to modify existing equipment and plants.

One area that could be enhanced is the fire resistance time, in terms of integrity and insulation performance, of glazings incorporating said layers. Furthermore it would be desirable to produce larger sized fire resistant glazings that will pass standard fire tests. It would also be attractive to provide fire resistant glazings with thinner layers of intumescent material, which can be produced by a faster drying and/or casting process. A quicker process reduces throughput time, increasing the volume of glazing that can be produced, with a lower manufacturing cost per unit of glazing. It is of course essential that any fluid compositions used to prepare silicate layers for fire resistant glazings are stable otherwise they will form a precipitate immediately or on standing. Since the dried/cast layer is used as part of a glazing it must be optically transparent, whereas the presence of particulate material such as a precipitate does not afford transparency and is therefore not acceptable.

According to a first aspect of the present invention there is provided an aqueous mixture for the production of fire resistant glazings comprising:
at least one alkali metal silicate,
at least one glass, glass-ceramic and/or ceramic additive, and
water,
wherein the at least one glass, glass-ceramic and/or ceramic additive has at least one boron containing moiety directly or indirectly attached to a surface thereof by covalent or ionic bonding.

According to another aspect of the present invention there is provided a transparent intumescent material for the production of fire resistant glazings comprising:
at least one alkali metal silicate,
at least one glass, glass-ceramic and/or ceramic additive, and
water,
wherein the at least one glass, glass-ceramic and/or ceramic additive has at least one boron containing moiety directly or indirectly attached to a surface thereof by covalent or ionic bonding.

DETAILED DESCRIPTION OF THE INVENTION

The inventors of the present invention have surprisingly found that the use of the glass, glass-ceramic and/or ceramic additives detailed above in an aqueous alkali metal silicate provides a mixture that, when dried and/or cured, affords a fire resistant material that exhibits a very uniform pore structure upon intumescence of the material under the conditions of a fire test.

The glass, glass-ceramic and/or ceramic additives have moieties attached to the surface which contain e.g. boron and preferably lithium, amongst other elements, which have a predisposition to hydrogen-bond strongly with water and any polyols present such as glycerol. Whilst not wishing to be bound by any particular theory it is thought that these strong interactions with water and polyols are driven for example by the Lewis acidity of the boron species and additionally in some embodiments the highly concentrated small positive nature of the lithium species, both of which can generate organised hydrogen-bonded clusters. It is also thought that the formation of ordered water and/or polyol clusters around said particles templates/promotes longer range ordering and that this results in a significantly improved distribution of water and/or polyols within a silicate matrix. It is this uniform distribution that allows a smooth release of water during the early phase of exposure to a fire, thereby providing a uniformly foamed and dense silicate structure at higher temperatures. This affords the material, or a glazing incorporating such material, a significantly improved fire protection performance.

The uniform pore structure obtained upon intumescence of the material provides improvements in integrity and insulating fire resistance performance of glazings incorporating a layer of said material. This enhanced fire resistance performance enables larger sized fire resistant glazings to pass standard fire tests and the use of thinner layers of intumescent material in fire resistant glazings, which improves processing and the associated advantages as detailed above. The present invention is additionally suited to the production of fire resistant glazings since the mixture is stable and the subsequently obtained material is transparent. In the context of the present invention the term "stable" means that the mixture does not generate a precipitate and therefore is readily pourable.

In the context of the present invention the term "glass" means an amorphous solid, the term "glass-ceramic" means a solid with an amorphous phase and one or more crystalline phases and the term "ceramic" means an inorganic, non-metallic solid.

In the context of the present invention the term "moiety" means a part of a molecular structure or sub-structure that may include either whole functional groups or parts of functional groups.

In the context of the present invention the size of a given particle equals the diameter of the sphere that has the same volume as the given particle.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Said boron containing moiety may be selected from the group consisting of boroxols, boron oxides, and their salts and derivatives, such as —B(OH)—, —B(OH)$_2$, —B(O$^-$)—, —B(O$^-$)$_2$, —B(O$^-$)—OH, —B(OLi)—, —B(OLi)$_2$, —B(OLi)—OH, —B(OSiR$_3$)—, —B(OSiR$_3$)$_2$, —B(OSiR$_3$)—OH, where R represents any suitable functional group i.e. the functional group must be capable of forming a covalent bond with Si. In advantageous embodiments said boron containing moiety also contains lithium.

Preferably the at least one glass, glass-ceramic and/or ceramic additive is in the form of at least one particle.

The boron and/or lithium containing moieties may cover at least a portion of a surface of an additive to a depth of at least 0.01 nm, preferably at least 0.1 nm, more preferably at least 0.5 nm, but preferably at most 10 nm, more preferably at most 5 nm.

Preferably at least 70% by weight, more preferably at least 80% by weight, even more preferably at least 85% by weight of the total weight of particles of the at least one glass, glass-ceramic and/or ceramic additive comprises particles with a volume-based particle size (where the size of a given particle equals the diameter of a sphere that has the same volume as the given particle) of from 1 to 7 μm, most preferably of from 2 to 6 μm. Preferably at most 90% by weight of the total weight of particles of the at least one glass, glass-ceramic and/or ceramic additive comprises particles with a volume-based particle size of from 1 to 7 μm, most preferably of from 2 to 6 μm. Surprisingly, and perhaps counterintuitively, the use of a distribution of particle sizes provides more controlled and uniform foaming behaviour than when using discrete particle sizes. This effect may be due to an avoidance of an excess of long range ordering of hydrogen bonded structures which can lead to structures large enough to scatter light and thereby cause unacceptable haze in the glazing. Particle size may be measured using a Malvern Mastersizer®.

Preferably at least 5% by weight, more preferably at least 7% by weight, even more preferably at least 9% by weight of the total weight of particles of the at least one glass, glass-ceramic and/or ceramic additive comprises particles with a volume-based particle size (where the size of a given particle equals the diameter of a sphere that has the same volume as the given particle) of less than 1 μm or more than 7 μm, most preferably of less than 2 μm or more than 6 μm. Preferably at most 10% by weight of the total weight of particles of the at least one glass, glass-ceramic and/or ceramic additive comprises particles with a volume-based particle size of less than 1 μm or more than 7 μm, most preferably of less than 2 μm or more than 6 μm.

Preferably the at least one glass, glass-ceramic and/or ceramic additive comprises particles with an average volume-based particle size (where the size of a given particle equals the diameter of a sphere that has the same volume as the given particle) of at least 3.0 μm, more preferably at least 3.5 μm, even more preferably at least 4.0 μm, most preferably at least 4.25 μm, but preferably at most 6.0 μm, more preferably at most 5.5 μm, even more preferably at most 5.0 μm, most preferably at most 4.75 μm.

Preferably the concentration of the at least one additive in the mixture is at least 0.00005% by weight, more preferably at least 0.0001% by weight, even more preferably at least 0.001% by weight, most preferably at least 0.005% by weight, but preferably at most 0.1% by weight, more preferably at most 0.05% by weight, even more preferably at most 0.02% by weight, most preferably at most 0.01% by weight. Preferably the concentration of the at least one additive in the material is at least 0.000075% by weight, more preferably at least 0.00015% by weight, even more preferably at least 0.0015% by weight, but preferably at most 0.15% by weight, more preferably at most 0.075% by weight, even more preferably at most 0.03% by weight. Whilst better water distribution via ordered hydrogen-bonded structures is beneficial, it is also advantageous to avoid an excess of long range order which has the propensity to lead to structures large enough to scatter light and thereby cause unacceptable haze in the glazing. Such effects can be observed upon attempts to increase the concentration of the additives.

The at least one alkali metal silicate may be potassium silicate, sodium silicate and/or lithium silicate. The molar ratio of $SiO_2:M_2O$ of the at least one alkali metal silicate in the mixtures and materials of the present invention, where M represents an alkali metal cation, is preferably at least 1.6:1 and more preferably is in the range 2.0:1 to 6.0:1, even more preferably in the range 2.0:1 to 5.0:1, most preferably in the range 2.5:1 to 4.0:1. Silicate solutions having a molar ratio of $SiO_2:M_2O$ in the range 2:1 to 4:1 are available as articles of commerce. Specifically solutions wherein this ratio is 2.0:1, 2.5:1, 2.85:1, 3.0:1 and 3.3:1 are available as articles of commerce. Solutions having a molar ratio of $SiO_2:M_2O$ between these values may be produced by blending these commercially available materials.

The material of the present invention may be in the form of a layer. The thickness of a layer of the material may vary through a wide range such as from 0.3 to 10.0 mm. Generally thicknesses of from 0.5 to 2.5 mm are preferred.

The mixtures and materials of the present invention may further comprise at least one polyol. The most preferred polyol is glycerol. Other compounds which can be used but whose use is less preferred include other polyols such as ethylene glycol, monosaccharides and polysaccharides.

Preferably the concentration of the polyol in the mixture is at least 2% by weight, more preferably at least 4% by weight, even more preferably at least 5% by weight, most preferably at least 5.5% by weight, but preferably at most 20% by weight, more preferably at most 15% by weight, even more preferably at most 10% by weight, most preferably at most 8% by weight. Preferably the concentration of the polyol in the material is at least 3% by weight, more preferably at least 6% by weight, even more preferably at least 8% by weight, but preferably at most 30% by weight, more preferably at most 25% by weight, even more preferably at most 20% by weight. As the concentration of polyol increases, the flexibility of the material which is produced when the mixture is dried and/or cured increases. This tends to improve the impact resistance properties of laminates incorporating a layer of said material. However the incorporation of an excessive proportion of the polyol can be disadvantageous particularly if the layer is relatively thick.

These thicker, heavier layers suffer from a tendency to slump particularly when used in larger sized laminates and such laminates are not acceptable in use. Furthermore although the glazings of this invention that comprise a polyol have surprisingly good fire resistant properties, increasing the quantity of polyol present contributes to the flammability of the material, and this may reduce the performance of the glazing in a fire test. For these reasons it is preferred that the mixture comprises no more than 20% of polyol. Most preferably the mixture comprises from 5.5 to 8% by weight of polyol.

The water content of the mixture will generally be at least 30% by weight, preferably at least 40% by weight, but generally not more than 70% by weight, preferably not more than 60% by weight.

The material of the present invention may comprise a water content of at least 15% by weight, preferably at least 20% by weight, more preferably at least 22.5% by weight, but preferably at most 35% by weight, more preferably at most 30% by weight, even more preferably at most 27.5% by weight.

According to another aspect of the present invention there is provided a fire resistant glazing comprising at least one layer of an intumescent material according to the present invention attached to at least one glass sheet.

The layer of intumescent material may be an interlayer attached to at least two glass sheets.

According to another aspect of the present invention there is provided a fire resistant glazing assembly comprising at least one fire resistant glazing according to the invention attached to a frame.

According to another aspect of the present invention there is provided a building incorporating at least one fire resistant glazing according to the invention.

According to another aspect of the present invention there is provided a method of preparing a mixture according to the invention comprising:

providing an aqueous solution of at least one alkali metal silicate, and adding at least one glass, glass-ceramic and/or ceramic additive, wherein the at least one glass, glass-ceramic and/or ceramic additive has at least one boron containing moiety directly or indirectly attached to a surface thereof by covalent or ionic bonding.

According to another aspect of the present invention there is provided a method of preparing a material according to the invention comprising:

drying and/or curing an aqueous mixture in accordance with the present invention.

The material may conveniently be produced by spreading the mixture onto the surface of a sheet of glass and subsequently evaporating water from the solution. In order to produce a layer of material of the desired thickness upon the glass it is sometimes necessary to provide an edge barrier on the glass which will retain the mixture during evaporation. The evaporation of water from the mixture is preferably carried out by drying it in an oven at a temperature of from 70 to 110° C. for a period of from 12 to 24 hours. By drying to higher residual water content, long drying times can be reduced, but it is necessary to improve the mechanical stability of the resultant layer. This can be achieved by the use of the additives described herein.

When the layer is produced by removing excess water the rate of evaporation of the water may conveniently be controlled by varying the relative humidity in the atmosphere. By maintaining a very high relative humidity (up to 100 RH) during the initial part of the drying step the rate of drying may be maintained at a relatively low level. Later in the process the Relative Humidity may be reduced in order to increase the rate of drying.

When the evaporation is complete the coated glass sheet may be removed from the oven and the retaining edge barrier removed by cutting the edges from the sheet. The resulting product is a fire resistant glazing comprising a layer of intumescent material attached to a glass sheet.

Another method of forming a fire resistant glazing is the so called cast in place method in which a mixture is introduced into the space between two opposed panes with a peripheral seal and cured to form an interlayer. In a cast in place process the water content of the mixture is retained in the cured interlayer. This high water content absorbs a quantity of heat during a fire through an endothermic process and thereby decreasing the transmission of radiant heat.

EP 620781 discloses a cast in place method for the production of a fire resistant glazing comprising a silicate interlayer. The method comprises applying a sealant around the entire circumference of two opposed glass panes thereby defining a cavity between them and pouring a silicate solution/mixture into that cavity. The silicate solution/mixture is then allowed to cure. The curing may be accelerated by raising the temperature of the glazing.

In an alternative process the mixtures may be dried and/or cured on the surface of a substrate and, provided that the interlayer has sufficient mechanical strength, it can be separated from the substrate and placed between two glass sheets to form a fire resistant glazing. Suitable substrates on which the mixture could be dried include glass, metals such as stainless steel and polymeric materials such as PTFE and polyolefins such as polypropylene. Where the substrate is transparent e.g. when the substrate is a transparent polymeric film, the film with the interlayer dried upon one surface may be mounted between two glass panes so as to form a fire resistant glazing without the need to separate the dried interlayer from the substrate.

According to another aspect of the present invention there is provided a method of preparing a fire resistant glazing according to the invention comprising:

drying and/or curing an aqueous mixture in accordance with the present invention upon at least one glass sheet.

A second sheet of glass may be bonded to the dried/cured layer of intumescent material to produce a laminated fire resistant glazing. Alternatively a second sheet of glass having a dried/cured layer of intumescent material can be bonded to the layer of the first sheet of glass and then a top sheet can be added to form a laminate having two interlayers. This process can be continued to produce however many interlayers are desired. Another alternative is to bond the second sheet with the interlayers in contact with one another and thus form a single interlayer having twice the thickness of the original.

The glass sheets used to form the laminates will normally be conventional sheets of soda-lime float glass. However other glass compositions may be employed in particular those having a higher strain temperature as these will increase the fire resistance of the laminate. Coated glasses, in particular those having a coating which reflects heat may also be used.

According to a further aspect of the present invention there is provided the use of a mixture according to the present invention in the preparation of a fire resistant glazing.

According to a further aspect of the present invention there is provided the use of a fire resistant glazing according to the present invention to prevent the spread of fire.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Embodiments of the present invention will now be described with reference to the following examples:

EXAMPLES

Glazing samples were prepared by drying silicate solutions on first glass panes under controlled conditions and then laminating to a second pane. The second pane of glass may have a dried layer of silicate material on a surface opposing the surface that is bonded to the silicate layer of the first pane. A third pane can then be added to form a laminate having two interlayers. This process can be continued to produce however many interlayers are desired.

For examples according to the invention, the additive XF100 (available from Johnson Matthey®), which is a glass, glass-ceramic and ceramic additive with boron containing moieties attached to the surface thereof, was mixed into glycerol and the resulting mixture was then added to a silicate solution to provide a mixture with a glycerol content of 4-12% wt and a silicate solution content of 88-96% wt. It is worth noting that the additive could be mixed into either the glycerol or the silicate solution first. The amount of additive used in each example of the invention was 0.01% wt. A sodium silicate solution, with a molar ratio of $SiO_2:M_2O$ of 3.3, was used for all of the examples. In all examples the final mixtures were dried until the layer of silicate had a water content of approximately 25% by weight. The samples were fire tested according to fire test BS-EN 1364 Pt 1:1999.

In each example the glass panes and the silicate interlayers were 2 m×1 m. The thicknesses of the glass panes and the interlayers are shown in Table 1 below. Comparative examples utilise standard Pyrostop® interlayers with the same composition as detailed above, but without the additive.

TABLE 1

Fire test results for a number of examples where, in relation to the structure, nG = the number of glass panes and nI = the number of interlayers. The structures have a glass pane in each of the two outer positions with alternate interlayers and glass panes between. The fill level indicates how many kg of final mixture were used for each $m^2$ of interlayer in each case.

| Example | Structure (thicknesses of glass panes and interlayers in mm) | Fill Level ($kg/m^2$) | Additive (% wt) | EI Rating (Mins) | E Rating (Mins) |
|---|---|---|---|---|---|
| 1 (Comparative) | 2G/1I (2.6/1.4/2.6) | 5 | None | — | 30 |
| 2 | 4G/3I (2.6/1.4/2.6/1.4/2.6/1.4/2.6) | 5 | 0.01 | — | 50 |
| 3 (Comparative) | 4G/3I (2.6/1.4/2.6/1.4/2.6/1.4/2.6) | 5 | None | 42 | 50 |
| 4 | 4G/3I (2.6/1.4/2.6/1.4/2.6/1.4/2.6) | 5 | 0.01 | 42 | 58 |
| 5 (Comparative) | 4G/3I (2.6/1.4/2.6/1.4/2.6/1.4/26) | 4 | None | 39 | 45 |
| 6 | 4G/3I (2.6/1.4/2.6/1.4/2.6/1.4/2.6) | 4 | 0.01 | 39 | 55 |
| 7 (Comparative) | 3G/2I (2.6/1.4/2.6/1.4/2.6) | 5 | None | 25 | 55 |
| 8 | 3G/2I (2.6/1.4/2.6/1.4/2.6) | 5 | 0.01 | 25 | 75 |
| 9 (Comparative) | 3G/2I (2.6/1.6/2.6/1.6/2.6) | 6 | None | 29 | 70 |
| 10 | 3G/2I (2.6/1.6/2.6/1.6/2.6) | 6 | 0.01 | 29 | 80 |

The results show EI (integrity and insulation) and E (integrity) Rating failures with an average temperature of >160° C. The glazings according to the present invention exhibit a substantial improvement (increase) in fire test failure times according to the E Rating in comparison with known glazings and perform as well as known glazings in accordance with the EI Rating.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An aqueous mixture for the production of fire resistant glazings comprising:
   at least one alkali metal silicate,
   at least one glass, glass-ceramic and/or ceramic additive, and water,
   wherein the at least one glass, glass-ceramic and/or ceramic additive has at least one boron containing moiety directly or indirectly attached to a surface thereof by covalent or ionic bonding, and wherein the concentration of the at least one additive in the mixture is at least 0.00005% by weight but at most 0.1% by weight.

2. The mixture according to claim 1, wherein said moiety is selected from the group consisting of boroxols, boron oxides, and their salts and derivatives.

3. The mixture according to claim 2, wherein said moiety is selected from the group consisting of —B(OH)—, —B(OH)2, —B(O—)—, —B(O—)2, —B(O—)—OH, —B(OLi)—, —B(OLi)2, —B(OLi)—OH, —B(OSiR3)—, —B(OSiR3)2, and —B(OSiR3)—OH, where R represents any suitable functional group.

4. The mixture according to claim 2, wherein said boron containing moiety also contains lithium.

5. The mixture according to claim 1, wherein the additive is in the form of at least one particle, wherein at least 70% but at most 90% by weight of the total weight of particles of the additive comprises particles with a volume-based particle size (where the size of a given particle equals the diameter of a sphere that has the same volume as the given particle) of from 1 to 7 µm.

6. The mixture according to claim 1, wherein the at least one additive comprises particles with an average volume-based particle size (where the size of a given particle equals the diameter of a sphere that has the same volume as the given particle) of at least 3.0 µm but preferably at most 6.0 µm.

7. The mixture according to claim 1, wherein the concentration of the at least one additive in the mixture is at least 0.0001% by weight but at most 0.01% by weight.

8. The mixture according to claim 1, wherein the molar ratio of $SiO_2:M_2O$ of the at least one alkali metal silicate in the mixture, where M represents an alkali metal cation, is in the range 2.5:1 to 4.0:1.

9. The mixture according to claim 1, wherein the mixture or material further comprises at least one polyol, wherein the concentration of the polyol in the mixture is at least 10% by weight but at most 25% by weight.

10. A transparent intumescent material for the production of fire resistant glazings comprising:
    at least one alkali metal silicate,
    at least one glass, glass-ceramic and/or ceramic additive, and water,
    wherein the at least one glass, glass-ceramic and/or ceramic additive has at least one boron containing moiety directly or indirectly attached to a surface thereof by covalent or ionic bonding, and wherein the concentration of the at least one additive in the material is at least 0.000075% by weight but at most 0.15% by weight.

11. The material according to claim 10, wherein said moiety is selected from the group consisting of boroxols, boron oxides, and their salts and derivatives.

12. The material according to claim 11, wherein said moiety is selected from the group consisting of —B(OH)—, —B(OH)2, —B(O—)—, —B(O—)2, —B(O—)—OH, —B(OLi)—, —B(OLi)2, —B(OLi)—OH, —B(OSiR3)—, —B(OSiR3)2, and —B(OSiR3)—OH, where R represents any suitable functional group.

13. The material according to claim 11, wherein the molar ratio of $SiO_2:M_2O$ of the at least one alkali metal silicate in the material, where M represents an alkali metal cation, is in the range 2.5:1 to 4.0:1.

14. The material according to claim 11, wherein the material further comprises at least one polyol, wherein the concentration of the polyol in the material is at least 17% by weight but at most 30% by weight.

15. The material according to claim 11, comprising a water content of at least 20% by weight but at most 30% by weight.

16. A fire resistant glazing comprising at least one layer of an intumescent material according to claim 11 attached to at least one glass sheet.

17. A fire resistant glazing assembly comprising at least one fire resistant glazing according to claim 16 attached to a frame.

18. A method of preparing a material according to claim 11, comprising: drying and/or curing an aqueous mixture comprising:
    at least one alkali metal silicate,
    at least one glass, glass-ceramic and/or ceramic additive, and water,
    wherein the at least one glass, glass-ceramic and/or ceramic additive has at least one boron containing moiety directly or indirectly attached to a surface thereof by covalent or ionic bonding.

19. A method of preparing a fire resistant glazing according to claim 11 comprising: drying and/or curing an aqueous mixture comprising:
    at least one alkali metal silicate,
    at least one glass, glass-ceramic and/or ceramic additive, and water,
    wherein the at least one glass, glass-ceramic and/or ceramic additive has at least one boron containing moiety directly or indirectly attached to a surface thereof by covalent or ionic bonding upon at least one glass sheet.

20. The material according to claim 10, wherein said boron containing moiety also contains lithium.

21. The material according to claim 10, wherein the additive is in the form of at least one particle, wherein at least 70% but at most 90% by weight of the total weight of particles of the additive comprises particles with a volume-based particle size (where the size of a given particle equals the diameter of a sphere that has the same volume as the given particle) of from 1 to 7 µm.

22. The material according to 10, wherein the at least one additive comprises particles with an average volume-based particle size (where the size of a given particle equals the diameter of a sphere that has the same volume as the given particle) of at least 3.0 µm but preferably at most 6.0 µm.

23. The material according to claim 10, wherein the concentration of the at least one additive in the material is at least 0.00015% by weight but at most 0.015% by weight.

* * * * *